United States Patent
Buchmann

(12) United States Patent    (10) Patent No.: US 12,242,464 B2
Buchmann    (45) Date of Patent: Mar. 4, 2025

(54) HANDLING OF LIFECYCLE AND DELIVERY FOR CODE LIST VALUES

(71) Applicant: SAP SE, Walldorf (DE)

(72) Inventor: Daniel Buchmann, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/144,897

(22) Filed: May 9, 2023

(65) Prior Publication Data

US 2024/0378190 A1    Nov. 14, 2024

(51) Int. Cl.
| | |
|---|---|
| *G06F 40/47* | (2020.01) |
| *G06F 16/21* | (2019.01) |
| *G06F 16/23* | (2019.01) |
| *G06F 21/31* | (2013.01) |
| *G06F 40/263* | (2020.01) |

(52) U.S. Cl.
CPC ........ *G06F 16/2379* (2019.01); *G06F 16/217* (2019.01); *G06F 21/31* (2013.01); *G06F 40/263* (2020.01); *G06F 40/47* (2020.01)

(58) Field of Classification Search
CPC .... G06F 16/2379; G06F 16/217; G06F 40/47; G06F 40/263; G06F 21/31
See application file for complete search history.

(56) References Cited

U.S. PATENT DOCUMENTS

| | | | |
|---|---|---|---|
| 11,687,487 B1 * | 6/2023 | Abdul-Jawad | G06Q 30/0201 |
| | | | 707/704 |
| 2021/0318989 A1 * | 10/2021 | Nagendra | G06F 16/178 |
| 2021/0374021 A1 * | 12/2021 | Santhakumar | G06F 3/0659 |
| 2022/0318252 A1 * | 10/2022 | Luciani | G06F 16/24568 |
| 2023/0385561 A1 * | 11/2023 | Kennedy, Jr. | G06F 40/51 |

\* cited by examiner

*Primary Examiner* — Tarek Chbouki
(74) *Attorney, Agent, or Firm* — Mintz Levin Cohn Ferris Glovsky and Popeo, P.C.

(57) ABSTRACT

A method, a system, and computer program product for managing data are provided. A request to access data from a table including the data and metadata associated with the data is received. The request to determine one or more relevant portions of the data is processed. A file corresponding to the one or more relevant portions of the data is generated by using the metadata. A repository object is generated from the file. A response to the request is transmitted. The response can provide access to update the relevant portions of the data in the repository object.

20 Claims, 4 Drawing Sheets

| Country Code 202 | Language Code 204 | Country Name 206 | NameSpace 208 |
|---|---|---|---|
| AD 210A | en 212A | ANDORA 214A | Sftw.s4.OrderHeader.ADdep1 216A |
| AE 210B | en 212B | UNITED ARAB EMIRATES 214B | Sftw.s4.OrderHeader.AEdep5 216B |
| AF 210C | en 212C | AFGHANISTAN 214C | Sftw.s4.OrderHeader.AFdep3 216C |

*FIG. 2*

HANDLING OF LIFECYCLE AND DELIVERY FOR CODE LIST VALUES

TECHNICAL FIELD

This disclosure relates generally to data processing and, in particular, to handling of data.

BACKGROUND

Companies can rely on software applications to manage different processes. Software applications can process data associated with various aspects of companies' practices, which can include product development, human resources, customer service, management, and many other aspects. Software applications typically operate from servers and can be stored in memory. Some data, like configurations or code list values include data. The data can be created by a software provider and can be evaluated using associated code. The difference in the mechanisms for delivery of data, corresponding to configurations, preferences, and upgrades that change throughout respective lifecycles, can result in inconsistencies that affect efficiency of operation of computing systems and respective software applications.

SUMMARY

In some implementations, the current subject matter relates to a computer implemented method for handling of data. In one aspect, a system includes: at least one data processor; and at least one memory storing instructions, which when executed by the at least one data processor, cause operations including: receiving a request to access data from a table including the data and metadata associated with the data, processing the request to determine one or more relevant portions of the data, generating by using the metadata, a file corresponding to the one or more relevant portions of the data, generating a repository object from the file, and transmitting a response to the request, the response providing access to update the one or more relevant portions of the data in the repository object.

In some variations, one or more features disclosed herein including the following features can optionally be included in any feasible combination. In some implementations, the operations further include: determining a current language associated with each of the one or more relevant portions of the data by processing the metadata. In some implementations, generating the file includes translating one or more of the one or more relevant portions of the data from the current language into at least one or more target languages. In some implementations, the operations further include: performing an authentication of a user generating the request to determine an access permission to the one or more relevant portions of the data according to associated namespaces. In some implementations, determining the one or more relevant portions of the data is based on the access permission. In some implementations, the file includes a text file with a table structured format. In some implementations, the operations further include: performing a validation of the one or more relevant portions of the data by using a set of requirements associated with data transportation and data editing for the one or more relevant portions of the data included in the file.

In another aspect, a computer-implemented method includes: receiving, by one or more processors, a request to access data from a table including the data and metadata associated with the data, processing, by the one or more processors, the request to determine one or more relevant portions of the data, generating, by the one or more processors, by using the metadata, a file corresponding to the one or more relevant portions of the data, generating, by the one or more processors, a repository object from the file, and transmitting, by the one or more processors, a response to the request, the response providing access to update the one or more relevant portions of the data in the repository object.

In some variations, one or more features disclosed herein including the following features can optionally be included in any feasible combination. In some implementations, the computer-implemented method further includes: determining, by the one or more processors, a current language associated with each of the one or more relevant portions of the data by processing the metadata. In some implementations, generating the file includes translating one or more of the one or more relevant portions of the data from the current language into at least one or more target languages. In some implementations, the computer-implemented method further includes: performing, by the one or more processors, an authentication of a user generating the request to determine an access permission to the one or more relevant portions of the data according to associated namespaces. In some implementations, determining the one or more relevant portions of the data is based on the access permission. In some implementations, the file includes a text file with a table structured format. In some implementations, the computer-implemented method further includes: performing, by the one or more processors, a validation of the one or more relevant portions of the data by using a set of requirements associated with data transportation and data editing for the one or more relevant portions of the data included in the file . . . .

In another aspect, a non-transitory computer-readable storage medium includes programming code, which when executed by at least one data processor, causes operations including: receiving a request to access data from a table including the data and metadata associated with the data, processing the request to determine one or more relevant portions of the data, generating by using the metadata, a file corresponding to the one or more relevant portions of the data, generating a repository object from the file, and transmitting a response to the request, the response providing access to update the one or more relevant portions of the data in the repository object.

In some variations, one or more features disclosed herein including the following features can optionally be included in any feasible combination. In some implementations, the operations further include: determining a current language associated with each of the one or more relevant portions of the data by processing the metadata. In some implementations, generating the file includes translating one or more of the one or more relevant portions of the data from the current language into at least one or more target languages. In some implementations, the operations further include: performing an authentication of a user generating the request to determine an access permission to the one or more relevant portions of the data according to associated namespaces. In some implementations, determining the one or more relevant portions of the data is based on the access permission. In some implementations, the file includes a text file with a table structured format. In some implementations, the operations further include: performing a validation of the one or more relevant portions of the data by using a set of requirements associated with data transportation and data editing for the one or more relevant portions of the data included in the file.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to customization of database tables, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates an example of a table, according to some implementations of the current subject matter;

Figure 1:
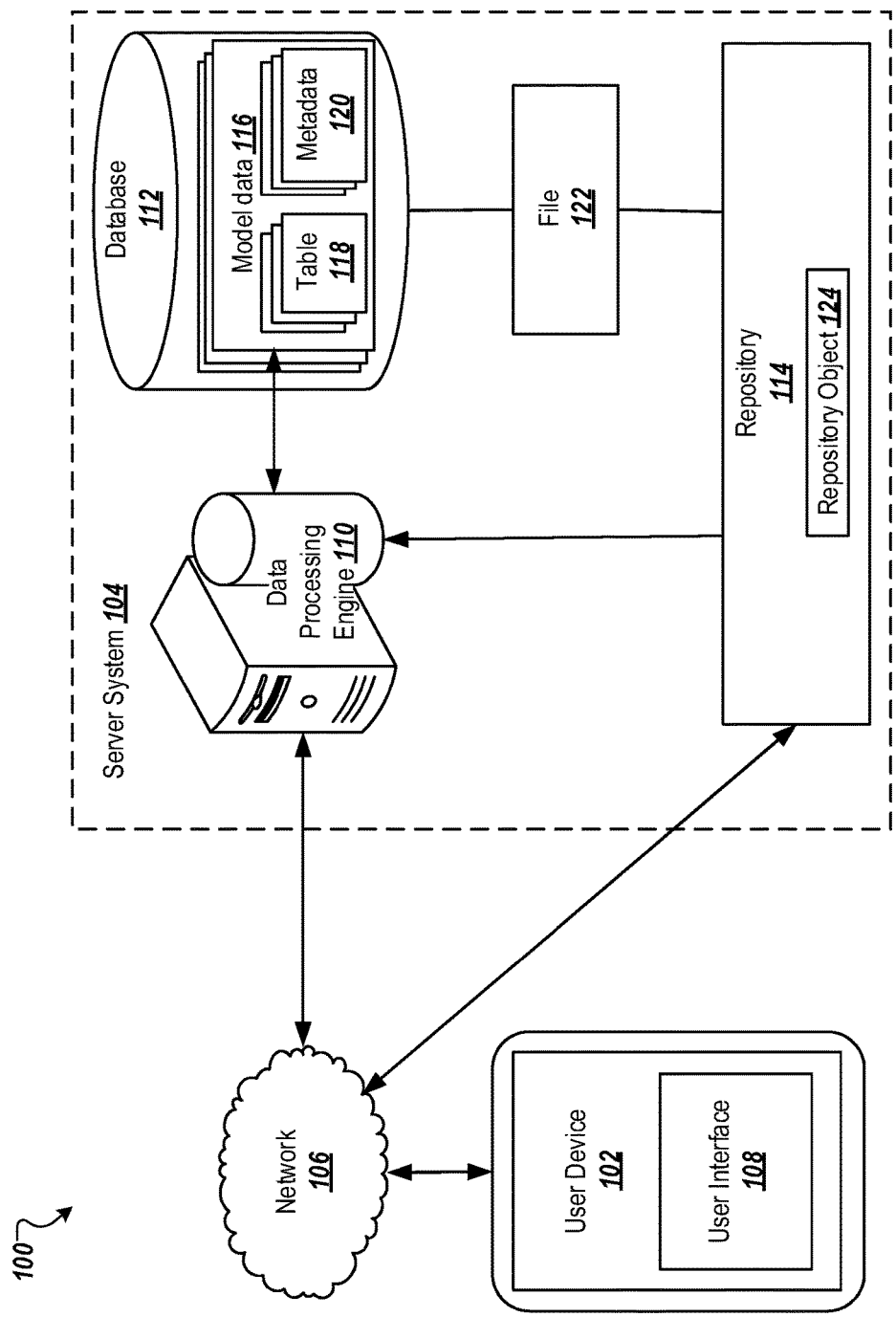
FIG. 1 illustrates an example of a system, according to some implementations of the current subject matter.

When practical, like labels are used to refer to same or similar items in the drawings.

DETAILED DESCRIPTION

Implementations of the present disclosure are generally directed to handling of data. More particularly, implementations of the present disclosure are directed to management of data treated like models, to be able to apply lifecycle feature available for models in an integrated lifecycle system, requests to access data from a table can be processed based on data ownership to determine relevant portions of the data that can be updated throughout the lifecycle of the data. Metadata associated with the data can be used to generate a file corresponding to the relevant portions of the data. The file is processed to generate a repository object that can be accessed by the data owner to update data.

In traditional systems configured for handling data, whenever the data structure changed, the table had to be reimported or to be deployed to fit the new table's structure. But even more critical, using traditional systems it was not be possible to transport just the data, to the owner of the namespace definition. For instance, if one layer defines a plain namespace, a sublayer layer would not be able to transport any data, because the upper layer is not accessible to the user requesting it, leading to inconsistencies between model content and corresponding data. To avoid the inconsistencies between model content and corresponding data of traditional lifecycle systems, repository objects are created to be accessible to authorized entities, such as data owners. In the implementations described herein, the current subject matter can be configured to generate a repository object based on a metadata derived file, to enable data owners to update relevant data portions corresponding to particular data fields without storage limitation related to particular data types. Data owner triggered updates without data type storage limitation can be implemented by making the namespace a repository object and by transmitting the key field of the repository object to the data owner for data updates. The use of repository objects enables secure, effective, and consistent updates of the data throughout lifecycles.

FIG. 1 illustrates an example of system 100 for handling of data, according to some implementations of the current subject matter. The system 100 can include a user device 102, a server system 104, and a network 106. The user device 102 can interact with the server system 104 to request access to data (e.g., product description, authorization checks, replication definitions, and/or product configuration formatted as tables including one or more fields) stored and managed by the server system 104.

The user device 102 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. Even though, not illustrated, in some implementations, multiple user devices 102 including different computing system configurations, such as different operating systems, different processing capabilities, different hardware components, and/or other differences can concurrently request services, from the server system 104. The user device 102 can include any combination of fixed and variable computing components. The user device 102 can include a user interface 108 to enable an entry of a user input including a request to access data from data (table). As shown in FIG. 1, the user device 102 can be communicatively coupled, via the network 106, with the server system 104 during an authenticated session to enable data transmission for accessing and managing data.

The server system 104 can include any form of servers including, but not limited to a web server (e.g., cloud-based server), an application server, a proxy server, a network server, and/or a server pool. In general, the server system 104 uses a data processing engine 110, a database 112, and a repository 114. The data processing engine 110 can include one or more processors configured to perform operations related to handling of data 116 (e.g., validations, translations, and/or data conversions). For example, the data processing engine 110 can include one or more processors configured to authenticate user inputs, received from the user device 102, including a request to access data 116 saved in the database 112, as tables 118 with associated metadata 120.

The database 112 can include a cloud database system environment, such as, Analytics Cloud (SAC) Data Warehouse Cloud or High performance Analytic Appliance (HANA), as available from SAP AG, Walldorf, Germany although other types of databases can be used as well. In some implementations, the database 112 can include an on-premise database system (e.g., system databases, tenant databases, etc.), servers (e.g., name server(s), index server(s), script server(s), etc.). The database 112 can include a runtime database that holds most recent data 116 (including tables 118 and metadata 120) to enable validated and trackable distribution processes of data. The database 112 can be include a multitenant database architecture (e.g., multitenant database containers (MDC)), such that each tenant of the server system 104 (using a respective user device 102) can customize tables 118 and respective metadata 120 stored by the database 112 and can be served by separate portions of the server system 104. The database 112 can be configured to store the tables 118 and the metadata 120 in any format, such as a table format, column-row format, key-value format, etc. (e.g., each key can be indicative of various attributes and each corresponding value can be indicative of attribute's value). As can be understood, the data 116 can be stored in any desired format, such as a text file including comma-separated values (csv file) having a format which allows data to be saved in a table structured format. The metadata 120 can be accessible, through the data processing engine 110, for updates over the lifetime of the data 116. In some implementations, the database 112 can be implemented in various in-memory database systems, such as a High-Performance Analytic Appliance ("HANA") system as developed by SAP SE, Walldorf, Germany. Various systems, such as, enterprise resource planning ("ERP") system, supply chain management ("SCM") system, supplier relationship management ("SRM") system, customer relationship management ("CRM") system, and/or others, can interact with the in-memory system for the purposes of accessing data, for example. Other systems and/or combinations of systems can be used for implementations of the database 112.

The data processing engine 110 can generate a file 122 that can be converted into a repository object 124 to be stored by the repository 114. The repository 114 that can be used for storage of one or more repository objects 124 that can be deployable to authenticated owners of the data 116. The user device 102 can be provided access to one or more containers (not shown in FIG. 1) of the repository 114 that can to be co-located on the same node. A user device 102 can have a shared storage within the database 112 and/or the repository 114, along with an indication of how to run the containers. The data 116 of the user device 102 can be co-located, co-scheduled, and/or run in a shared context within the database 112 and/or the repository 114 and can be transmitted from the repository object 124 to the user device 102 via the network 106.

The network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

Using the example system 100, illustrated in FIG. 1, the data 116 can be imported into the repository 114 and can represent a process configuration formatted as a table (e.g., as shown in FIG. 2), which can include multiple fields. The repository 114 can be configured to provide the user device 102 access to the data 116 by using a derived repository object 124. The request to access the data 116 can also include various modifications, preferences, changes, add-ons, personalization, etc. that can be created/generated by a user device 102 of a user authenticated as a data owner of the requested data.

In some implementations, during runtime, the user device 102 can access the repository 114 to obtain access to/read one or more repository objects 124 (e.g., data structured as tables). For example, a query can be generated by the user device 102 and transmitted to the data processing engine 110, which can determine whether the repository 114 contains a requested repository object 124 and can generate repository objects 124 to enable handling of data 116. Once the data processing engine 110 determines that a particular repository object 124 is stored in the repository 114 and/or any additional metadata is stored in the database 112, the data processing engine 110 can retrieve a portion of the repository object 124 from the repository 114 and provide it to the requesting user device 102.

FIG. 2 illustrates an example of a table 200 of installed products. The example table 200 can include multiple columns 202, 204, 206, each corresponding to a data code "country code," "language code," and "country name" and, optionally, namespaces 208. For example, column 202 can include field entries 210A, 210B, 210C as text (e.g., AD, AE, AF, etc.), column 204 can include field entries 212A, 212B, 212C as text (e.g., en), column 206 can include field entries 214A, 214B, 214C as text (e.g., Andora, United Arab Emirates, Afghanistan, etc.), and column 206 can include field entries 216A, 216B, 216C as namespaces (e.g., Sftw.s4.OrderHeader.ADdep1, Sftw.s4.OrderHeader.AEdep5, Sftw.s4.OrderHeader.AFdep3, etc.). Namespaces can include a prefix separated from the actual value by a dot. Namespaces can be nested, with the different levels that are separated by dots. An example of a namespace can be structured as "top.middle.bottom.ID."

A first portion of the namespaces can be applied universally across data corresponding to multiple data owners being fixed (not changeable by data owners). A second portion of the namespaces can define an operation level of respective data owners. The namespaces can be a part of the object key, the string after the right-most dot represents the actual ID of the object. Within the illustrated namespace examples, "s4" can be a child of "sftw" and "OrderHeader" can be a child of "s4." In the example namespace "Sftw.s4.OrderHeader.ADdep1" the namespace-portion of the overall ID is "Sftw.s4.OrderHeader" and the view field can be "ADdep1."

The metadata associated with the field entries can be configurable to define namespace data types and to set the editing status for respective data owners. In some implementations, field updates can include adding a second type of data. Namespaces need not to be defined redundantly—each namespace can specify, for which levels it is applicable. A long namespace, for example, might not be suitable for extensibility because of length restrictions. The server system can enable the content developer (data owner) to create namespaces according to applicable guidelines.

The example table 200 can have one or more key fields (a column or a combination of columns in a database that uniquely identifies a data entry). The key field can have a namespace (data owner label presented in quotation marks) that is associated with it. The metadata associated with the data includes namespaces that distinguish data portions content ownership. The namespaces can reflect ownership layers. The ownership layers are indicated in the namespaces by extensions marked by periods. The ownership layers can include a top layer that uses a value defined by a lower layer. A user with access to the top layer can refine a lower key field, to define its own namespace, using a different key field than an existent key field.

The namespace can include an object that specifies the key field. In the below example, the key field is given as @Metadata.dataMaintenance.ownership.keyElement together with the associated annotation. In some implementations, the namespace can indicate that the data is fully managed by the software provider, or whether it is just a default that can be adapted by the user. Namespaces can be applied to multiple use cases including code list use case (user defined list of values, for a list element of a table) and configuration use cases (user defined configurations of values of a table). For the code list use case, the responsibility resides with the software provider and the values can be updated during the software lifecycle. Namespaces indicating configuration use case is associated with data portions that can be delivered to users to edit the data and the data updates can be stored in a database. In the configuration use case, an annotation (e.g., metadata included into a table definition) @Metadata.dataMaintenance.ownership.deliveryMode can be used to indicate editable data. The annotation can be optional. If not set, the system (data processing engine) can be configured to assume the data to be updated by the respective owner on each delivery.

Figure 3:
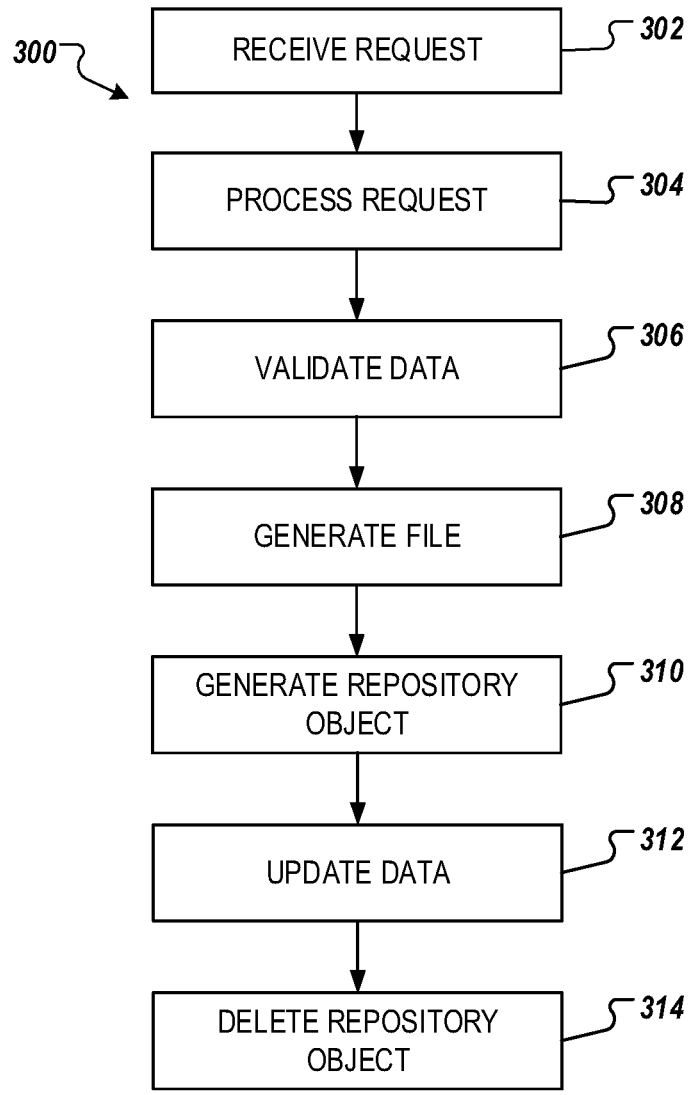
FIG. 3 illustrates an example of a process, according to some implementations of the current subject matter.

FIG. 3 depicts a flowchart illustrating an example process 300 for managing artifact related metadata in accordance with some example implementations. The example process 300 can be executed by the example system 100 shown in FIG. 1, the system 400 shown in FIG. 4 or any combination thereof.

At 302, a request to access data (data) from one or more tables is received, by a data processing system (e.g., data processing system 110 describes in FIG. 1). The table can include data and metadata associated with the data. The request to access the data can include a request to update the data based on one or more operations including modifications, preferences, changes, add-ons, and/or personalization that can be created/generated by a user device of a user authenticated as a data owner of the requested data. The data can include a first portion of the data owned by a software provider and a second portion of the data owned by a user of the user device sending the request. In some implementations, at least a portion of the second portion of the data is owned by multiple users of user devices, identified as software subscribers, partners and/or project collaborators. The metadata refers to namespaces that are allowed to be used with the data. The actual use of the namespaces in the data defines which record belongs to whom. The namespace can include a text in quotation marks that acts as a prefix and is separated by a dot from an extension. For example, the metadata can include two namespaces defined as "sap" and "sap.isOil." The namespace "sap" can be editable by every user authenticated as a software subscriber using user devices, where software-content is developed. The namespace "sap.isOil" can be editable only by a user authenticated as a tenant where the repository package belonging to a particular software package (e.g., industry solution "is Oil") is developed. Each namespace included in the metadata can specify for which levels it is applicable, to avoid redundancy. For example, if all portions of the data included in the table are accessible to a particular type of users a single namespace can be used to define the overall access level to the data, without further distinction. A keyfield where the namespace is to be applied can have length restrictions. For example, a long namespace, might not be suitable for extensibility because of the length restrictions. A software content developer can create associated namespaces according to applicable guidelines. In some implementations, the table annotations define what namespaces are applicable for a table. The annotation can be set only for tables saved in a database, such that a table carrying the annotations is prevented from being used with replication scenarios.

At 304, the request is processed to determine relevant portions of the data. Processing the request can include performing an authentication of a user generating the request to determine an access permission to the relevant portions of the data according to associated namespaces. The access permission defines whether particular portions of the data can be edited by the user at all. The data portions can include code lists where modifications (e.g., addition) are prohibited. The data portions that are unmodifiable can be locked for users and their partners. The locked data portions can include a flag (e.g., "@Metadata.dataMaintenance.Only") that indicate the locked status and are excluded from the relevant portions of the data. The annotation can indicate that the access to the data in the table can have an internal differentiation by layers, to indicate the ownership. The annotation can be used to configure the data portions that are not locked, extract the data portions that are accessible to the authenticated user. The filtered data portions can be retrieved from the database using data identifiers. In some implementations, a unique identifier for the text can be used as a key of an object (e.g., JSON object) to identify a particular text. In some implementations, another map having the same type as the text as a key to separate different scenarios for texts that can be contained in forms, hyperlinks, columns, etc.

In some implementations, determining the relevant portions of the data includes determining a current language associated with each of the relevant portions of the data by processing the metadata. For example, the relevant data portions can have language-dependent texts. A text within the relevant data portions of the table can be recognized from existing annotations. The text table also can correspond to different language codes.

At 306, a validation of the relevant portions of the data is performed by using a set of requirements associated with data transportation and data editing restrictions (defines entities allowed to edit the data and prevents editing to unauthorized entities) for the relevant portions of the data included in the file. The validation can include checks based on one or more criteria that can include character restrictions (only valid characters can be included), range restrictions, and value specifications. During the validation it can be determined if the relevant portions of the data matches the rule set of the respective namespace corresponding to the authenticated user of the user device. For example, validation can ensure that the definitions are done identically for relevant portions of the data retrieved from corresponding tables. The validation can be performed by a general-purpose validation framework (e.g., data processing engine 110 described with reference to FIG. 1) that checks for consistency and plausibility based on semantic validation. The validation framework may also generate additional metadata. For example, the validation framework may format (reduce and/or expand) the relevant portions of the data to comply with the rule set.

Figure 4:
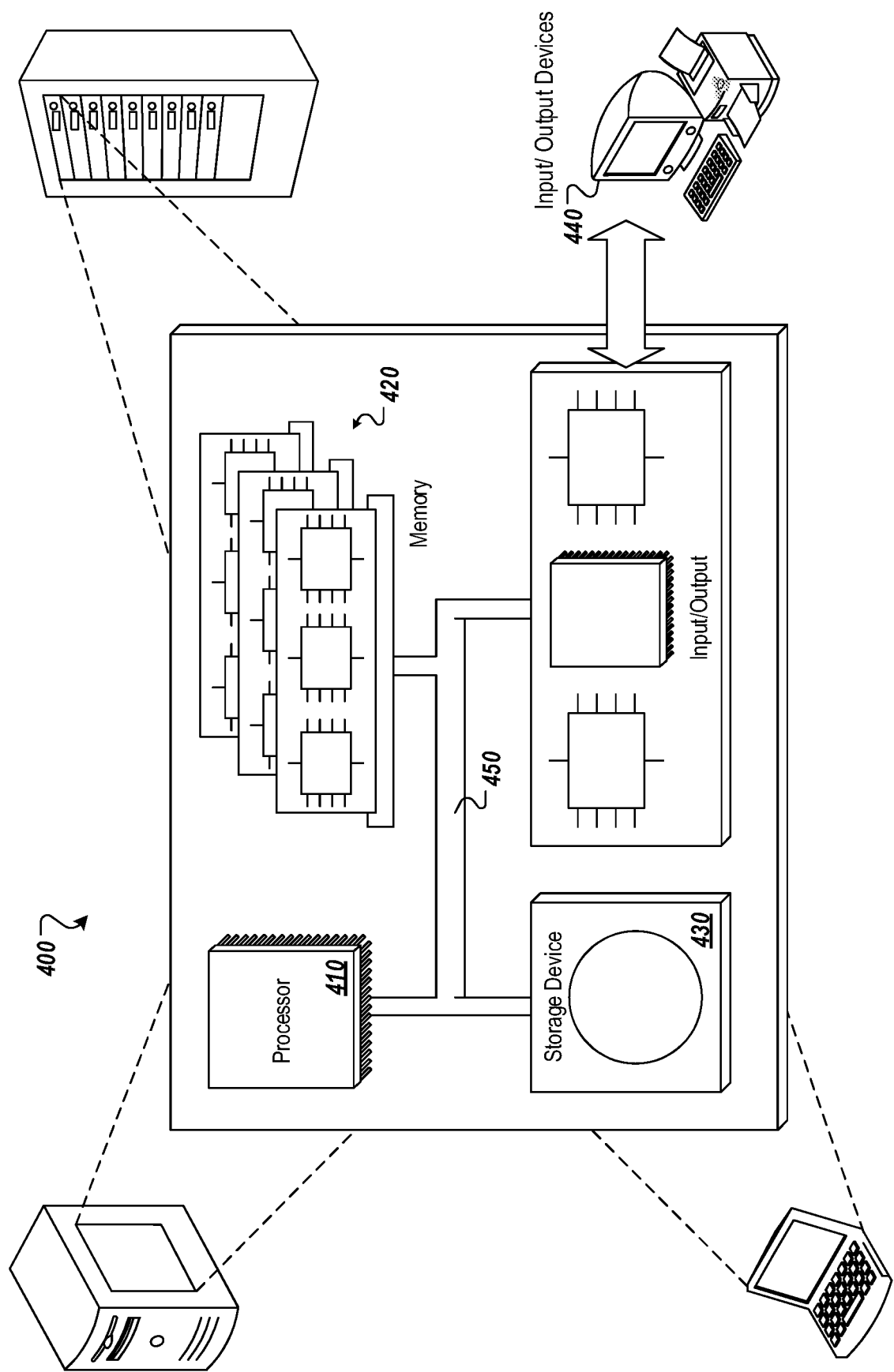
FIG. 4 illustrates an example of a computing system diagram, in accordance with some example implementations.

At 308, a file corresponding to the relevant portions of the data is generated. The file can be configured to optimize data transmission. The file can include a text file with a table structured format. The relevant data portions can be from multiple (two or more) tables that are joined into the file as a single object, which can required translation for data consistency. In some implementations, the file is generated by translating one or more of the relevant portions of the data from the current language into at least one or more target languages and saving the translation in a new file (document). In some implementations, the texts can be translated into most commonly used languages rather than into all languages. One or more placeholder folders can be included for language(s) that are not commonly used, as shown in FIG. 4 by "language3" and "language4" placeholders. As such, when a translation into placeholder language of a specific text becomes available and/or is requested, the folders can be populated with appropriate information.

At 310, a repository object is generated from the file. Pulling the relevant portions of the data in to a repository, enables data handling, by the user, as an appendix of the repository object. For example, a new custom attribute of type string can be added if the csv-file is serialized. The repository object enables an efficient coupling of the lifecycle of metadata and data. The file becomes a new repository object type. The data (as a package) in the repository object can have its own lifecycle. Dependencies can be defined from the repository object to the corresponding table-object stored in the database. The data object in the repository is an auxiliary means to get it transported and to be able to apply the lifecycle-capabilities already available in the repository. For example, the data-repository-object can be created whenever the data-repository-object is to be read from the repository; which happens rather scarcely. The creation per request ensures that the current state can be obtained without having to update that repository-object on each change to the data. In some implementations, an empty repository-data-object can be created whenever the metadata of the table definition indicates that data can be created in one of the namespaces open for editing. The empty repository-data object can be used as an indicator of a possible data transport. Filling in the actual data in the empty repository-data object can happen whenever the respective data-repository-object is requested.

At 312, a response to the user request is transmitted from to the user device to enable changes to the relevant portions of the data in the repository object. In response to determining that a repository object was generated, the data changes are transmitted to the database to be stored in the respective table. Updating the relevant portions of the data in the repository object can provide efficient and correct deployment of the data changes to the database. Updating the relevant portions of the data outside the repository object can be prohibited because updating the relevant portions of the data outside the repository object can generate a loss in connections and dependencies between metadata and data, potentially introducing data inconsistencies. For example, the data update can be performed whenever a content delivery is imported into the tenant, which contains a data-repository-object. The repository can trigger the deployment of data content in general and writing operations into the table. For data import, the considerations about locked namespaces do not matter because the protected content can be changed considering that the source of the content delivery is a trustworthy owner.

At 314, in response to determining an end of a lifecycle of the repository object, the repository object is deleted from the repository optimizing repository storage requirements.

The example process 300 enables optimization of data handling throughout a lifecycle, providing data access compliance with set rules. The described implementations of the example process 300 can be implemented by using a repository object that provides data that is accessible for updates over the lifetime of the data. The repository object based on a metadata derived file can enable data owners to update relevant data portions corresponding to particular data fields without storage limitation related to particular data types. The example process 300 ensures consistencies between model content and corresponding data, without data type storage limitation by making the namespace a repository object and by transmitting the key field of the repository object to the data owner for data updates. The use of repository objects in the example process 300 enables secure, effective, and consistent updates of the data throughout lifecycles.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A system comprising: at least one data processor; and at least one memory storing instructions, which when executed by the at least one data processor, cause operations comprising: receiving a request to access data from a table comprising the data and metadata associated with the data; processing the request to determine one or more relevant portions of the data; generating by using the metadata, a file corresponding to the one or more relevant portions of the data; generating a repository object from the file; and transmitting a response to the request, the response providing access to update the one or more relevant portions of the data in the repository object.

Example 2: The system of example 1, wherein the operations further comprise: determining a current language associated with each of the one or more relevant portions of the data by processing the metadata.

Example 3: The system of any one of the preceding examples, wherein generating the file comprises translating one or more of the one or more relevant portions of the data from the current language into at least one or more target languages.

Example 4: The system of any one of the preceding examples, wherein the operations further comprise: performing an authentication of a user generating the request to determine an access permission to the one or more relevant portions of the data according to associated namespaces.

Example 5: The system of any one of the preceding examples, wherein determining the one or more relevant portions of the data is based on the access permission.

Example 6: The system of any one of the preceding examples, wherein the file comprises a text file with a table structured format.

Example 7: The system of any one of the preceding examples, wherein the operations further comprise: performing a validation of the one or more relevant portions of the data by using a set of requirements associated with data transportation and data editing for the one or more relevant portions of the data included in the file.

Example 8: A computer-implemented method comprising: receiving, by one or more processors, a request to access data from a table comprising the data and metadata associated with the data; processing, by the one or more processors, the request to determine one or more relevant portions of the data; generating, by the one or more processors, by using the metadata, a file corresponding to the one or more relevant portions of the data; generating, by the one or more processors, a repository object from the file; and transmitting, by the one or more processors, a response to the request, the response providing access to update the one or more relevant portions of the data in the repository object.

Example 9: The computer-implemented method of example 8, further comprising: determining, by the one or more processors, a current language associated with each of the one or more relevant portions of the data by processing the metadata.

Example 10: The computer-implemented method of any one of the preceding examples, wherein generating the file comprises translating one or more of the one or more relevant portions of the data from the current language into at least one or more target languages.

Example 11: The computer-implemented method of any one of the preceding examples, further comprising: performing, by the one or more processors, an authentication of a user generating the request to determine an access permission to the one or more relevant portions of the data according to associated namespaces.

Example 12: The computer-implemented method of any one of the preceding examples, wherein determining the one or more relevant portions of the data is based on the access permission.

Example 13: The computer-implemented method of any one of the preceding examples, wherein the file comprises a text file with a table structured format.

Example 14: The computer-implemented method of any one of the preceding examples, further comprising: performing, by the one or more processors, a validation of the one or more relevant portions of the data by using a set of requirements associated with data transportation and data editing for the one or more relevant portions of the data included in the file.

Example 15: A non-transitory computer-readable storage medium comprising programming code, which when executed by at least one data processor, causes operations comprising: receiving a request to access data from a table comprising the data and metadata associated with the data; processing the request to determine one or more relevant portions of the data; generating by using the metadata, a file corresponding to the one or more relevant portions of the data; generating a repository object from the file; and transmitting a response to the request, the response providing access to update the one or more relevant portions of the data in the repository object.

Example 16: The non-transitory computer-readable storage medium of example 15, wherein the operations further comprise: determining a current language associated with each of the one or more relevant portions of the data by processing the metadata.

Example 17: The non-transitory computer-readable storage medium of any one of the preceding examples, wherein generating the file comprises translating one or more of the one or more relevant portions of the data from the current language into at least one or more target languages.

Example 18: The non-transitory computer-readable storage medium of any one of the preceding examples, wherein the operations further comprise: performing an authentication of a user generating the request to determine an access permission to the one or more relevant portions of the data according to associated namespaces, wherein determining the one or more relevant portions of the data is based on the access permission.

Example 19: The non-transitory computer-readable storage medium of any one of the preceding examples, wherein the file comprises a text file with a table structured format.

Example 20: The non-transitory computer-readable storage medium of any one of the preceding examples, wherein the operations further comprise: performing a validation of the one or more relevant portions of the data by using a set of requirements associated with data transportation and data editing for the one or more relevant portions of the data included in the file.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system comprising:
   at least one data processor; and
   at least one memory storing instructions, which when executed by the at least one data processor, cause operations comprising:
   receiving a request to access data from a table comprising the data and metadata associated with the data, wherein the metadata includes a namespace indicating one or more ownership layers of the data;
   processing the request to determine one or more relevant portions of the data;
   generating by using the metadata, a file corresponding to the one or more relevant portions of the data;
   processing the file to generate a repository object that can be accessed by a data owner to update the one or more relevant portions of the data without storage limitation related to particular data types, wherein the namespace specifies the data owner that can access the repository object; and
   transmitting a response to the request, the response comprising a key field of the repository object, and the response providing access to update the one or more relevant portions of the data in the repository object.

2. The system of claim 1, wherein the operations further comprise:
   determining a current language associated with each of the one or more relevant portions of the data by processing the metadata; and generating the file comprises translating one or more of the one or more relevant portions of the data from the current language into at least one or more target languages.

3. The system of claim 1, wherein the namespace specifies for which levels the namespace is applicable.

4. The system of claim 1, wherein the operations further comprise: performing an authentication of a user generating the request to determine an access permission to the one or more relevant portions of the data according to associated namespaces, wherein determining the one or more relevant portions of the data is based on the access permission.

5. The system of claim 1, wherein the operations further comprise validating whether the one or more relevant portions of the data match a rule set of the namespace corresponding to the user.

6. The system of claim 1, wherein a first portion of the namespace is applied across data corresponding to multiple data owners, and wherein a second portion of the namespace defines an operational level of respective data owners.

7. The system of claim 1, wherein the operations further comprise:
performing a validation of the one or more relevant portions of the data by using a set of requirements associated with data transportation and data editing for the one or more relevant portions of the data included in the file.

8. A computer-implemented method comprising:
receiving, by one or more processors, a request to access data from a table comprising the data and metadata associated with the data, wherein the metadata includes a namespace indicating one or more ownership layers of the data;
processing, by the one or more processors, the request to determine one or more relevant portions of the data;
generating, by the one or more processors, by using the metadata, a file corresponding to the one or more relevant portions of the data;
processing, by the one or more processors, the file to generate a repository object that can be accessed by a data owner to update the one or more relevant portions of the data without storage limitation related to particular data types, wherein the namespace specifies the data owner that can access the repository object; and
transmitting, by the one or more processors, a response to the request, the response comprising a key field of the repository object, and the response providing access to update the one or more relevant portions of the data in the repository object.

9. The computer-implemented method of claim 8, further comprising:
determining, by the one or more processors, a current language associated with each of the one or more relevant portions of the data by processing the metadata; and
generating the file comprises translating one or more of the one or more relevant portions of the data from the current language into at least one or more target languages.

10. The computer-implemented method of claim 8, wherein the namespace specifies for which levels the namespace is applicable.

11. The computer-implemented method of claim 8, further comprising: performing, by the one or more processors, an authentication of a user generating the request to determine an access permission to the one or more relevant portions of the data according to associated namespaces, wherein determining the one or more relevant portions of the data is based on the access permission.

12. The computer-implemented method of claim 8, further comprising validating whether the one or more relevant portions of the data match a rule set of the namespace corresponding to the user.

13. The computer-implemented method of claim 8, wherein a first portion of the namespace is applied across data corresponding to multiple data owners, and wherein a second portion of the namespace defines an operational level of respective data owners.

14. The computer-implemented method of claim 8, further comprising:
performing, by the one or more processors, a validation of the one or more relevant portions of the data by using a set of requirements associated with data transportation and data editing for the one or more relevant portions of the data included in the file.

15. A non-transitory computer-readable storage medium comprising programming code, which when executed by at least one data processor, causes operations comprising:
receiving a request to access data from a table comprising the data and metadata associated with the data, wherein the metadata includes a namespace indicating one or more ownership layers of the data;
processing the request to determine one or more relevant portions of the data;
generating by using the metadata, a file corresponding to the one or more relevant portions of the data;
processing the file to generate a repository object that can be accessed by a data owner to update the one or more relevant portions of the data without storage limitation related to particular data types, wherein the namespace specifies the data owner that can access the repository object; and
transmitting a response to the request, the response comprising a key field of the repository object, and the response providing access to update the one or more relevant portions of the data in the repository object.

16. The non-transitory computer-readable storage medium of claim 15, wherein the operations further comprise:
determining a current language associated with each of the one or more relevant portions of the data by processing the metadata; and
generating the file comprises translating one or more of the one or more relevant portions of the data from the current language into at least one or more target languages.

17. The non-transitory computer-readable storage medium of claim 15, wherein the namespace specifies for which levels the namespace is applicable.

18. The non-transitory computer-readable storage medium of claim 15, wherein the operations further comprise: performing an authentication of a user generating the request to determine an access permission to the one or more relevant portions of the data according to associated namespaces, wherein determining the one or more relevant portions of the data is based on the access permission.

19. The non-transitory computer-readable storage medium of claim 15, wherein a first portion of the namespace is applied across data corresponding to multiple data owners, and wherein a second portion of the namespace defines an operational level of respective data owners.

20. The non-transitory computer-readable storage medium of claim 15, wherein the operations further comprise:
 performing a validation of the one or more relevant portions of the data by using a set of requirements associated with data transportation and data editing for the one or more relevant portions of the data included in the file.

* * * * *